United States Patent [19]

Crorey

[11] Patent Number: 6,003,850
[45] Date of Patent: Dec. 21, 1999

[54] ELECTRIC POWER OPERATED CLAMP

[75] Inventor: David J. Crorey, Clinton Township, Mich.

[73] Assignee: ISI Norgren, Inc., Mt. Clemens, Mich.

[21] Appl. No.: 09/067,203

[22] Filed: Apr. 28, 1998

[51] Int. Cl.[6] ....................................................... A22Q 3/03
[52] U.S. Cl. ........................................... 269/233; 269/235
[58] Field of Search .............................. 269/32, 228, 233, 269/93, 94, 235; 74/25, 55

[56] References Cited

U.S. PATENT DOCUMENTS

| | | |
|---|---|---|
| 3,599,957 | 8/1971 | Blatt . |
| 4,459,945 | 7/1984 | Chatfield ..................................... 74/55 |
| 4,494,739 | 1/1985 | Valentine . |
| 4,723,767 | 2/1988 | McPherson et al. . |

*Primary Examiner*—Robert C. Watson
*Attorney, Agent, or Firm*—Young & Basile, P.C.

[57] ABSTRACT

A clamping apparatus includes a housing and a pivot pin mounted for pivoting movement about an axis of rotation with respect to the housing. A clamp member is connected to the pivot pin and is moveable between a clamped position and a released position in response to rotation of the pivot pin. The pivot pin has an arm extending radially outwardly from the axis of rotation. A drive member is mounted for linear reciprocal movement along a fixed path with respect to the housing, and a linkage connects the drive member to the arm of the pivot pin for converting reciprocal movement of the drive member into pivoting movement of the pivot pin. An electric motor is connected to an output shaft with an axis of rotation, and a first converting mechanism connects the drive member to the electric motor for converting the rotary motion driving force into a linear reciprocal harmonic motion of the drive member.

19 Claims, 2 Drawing Sheets

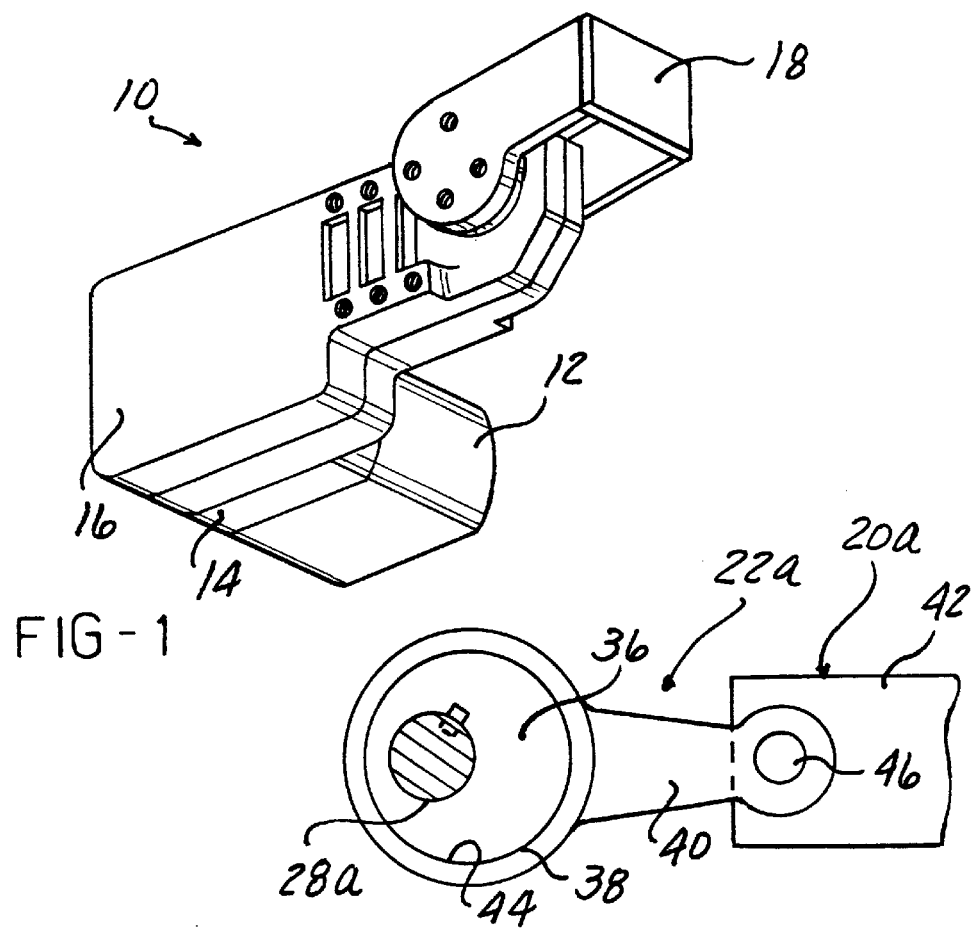
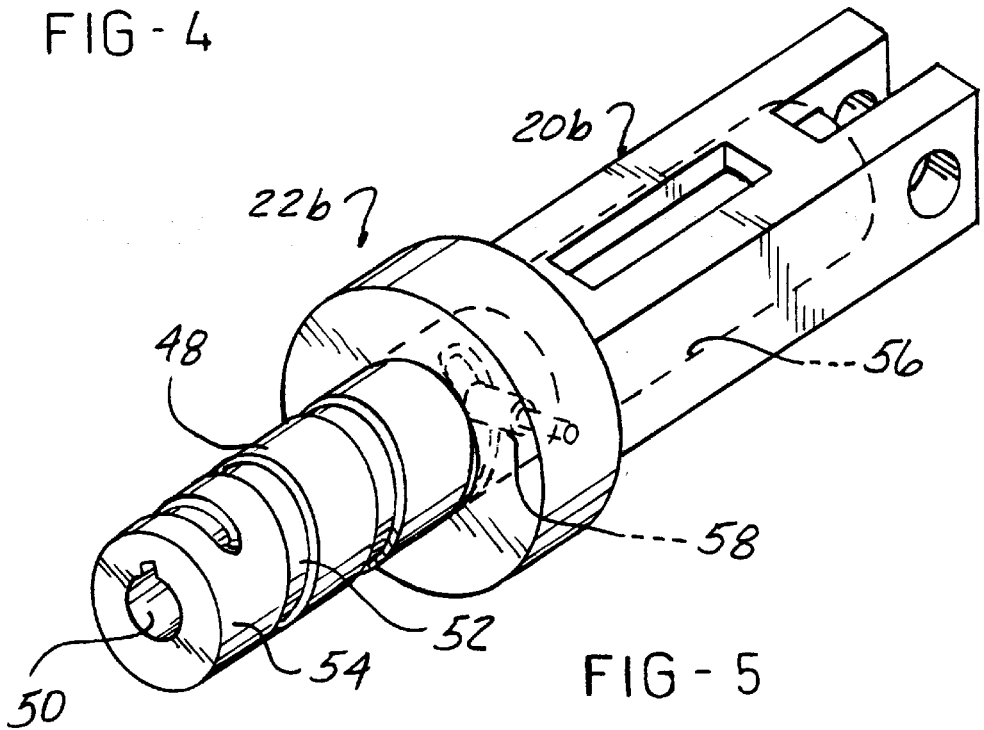

ELECTRIC POWER OPERATED CLAMP

FIELD OF THE INVENTION

The present invention relates to an electric power operated clamp for moving at least one clamp arm between a clamped position and a released position.

BACKGROUND OF THE INVENTION

Various clamping devices have been provided for immovably securing a workpiece or workpieces with respect to a stationary support during a machining and/or welding operation. Most of these devices have incorporated fluid operated actuators, such as hydraulic or pneumatic operated piston and cylinder actuators. While these devices are satisfactory for clamping workpieces to a stationary support, difficulties arise in using clamps of this configuration for use in non-stationary support situations, such as moving transfer devices, conveyors, shuttles or the like. In addition, the use of hydraulic fluid in non-stationary applications can be the source of hydraulic fluid leaks, while the use of pneumatic actuators increases cost of operation by requiring the production of sufficient quantities of compressed air of pre-defined quality for operating clamping devices. Compressed air generally requires the use of fixed or flexible conduits to communicate the compressed air with the actuator, and may produce compressed air leaks increasing operating costs. Furthermore, it is difficult to obtain a harmonic motion clamp action with a hydraulic or pneumatic actuator, sometimes referred to as a "soft-touch" clamp, where the clamp decelerates adjacent the clamped and/or released position thereby eliminating the need for "bumpers" or other shock absorbing elements. Typically, hydraulic and pneumatic actuated clamps require complex control mechanisms to adjust the rate of actuation of the clamp to eliminate or reduce the amount of shock absorbed as the clamp reaches the clamped position and/or the released position.

SUMMARY OF THE INVENTION

It is desirable in the present invention to provide an electric power operated clamp to eliminate the recognized deficiencies in hydraulic and/or pneumatic operated clamps. In addition, it is desirable in the present invention to provide an electric power operated clamp having harmonic clamp motion, where the clamp decelerates as it approaches the clamped position and/or released position. The present invention provides a power operated clamp including an electric motor means for imparting a rotary motion driving force. A drive member is operably associated with the electric motor means. First converting means connects the drive member to the electric motor means. The first converting means converts the rotary motion driving force of the electric motor means into a linear reciprocal motion of the drive member. A clamp member is operably associated with the drive member. Second converting means connects the clamp member to the drive member. The second converting means converts the linear reciprocal motion of the drive member into rotary motion of the clamp arm to move the clamp member between a clamped position and a released position.

In the preferred configuration, the first converting means includes an elongate arm connected to a shaft of the electric motor means which extends radially outwardly for rotation with the shaft. A cam follower is connected to the elongate arm spaced radially from the shaft. The drive member is mounted for linear reciprocal movement along a fixed path. The drive member has a cam surface defining a slot adjacent one longitudinal end of the elongate drive member. The slot extends generally normal to the fixed path of the drive member. The cam follower operably engages within the slot for converting the rotational movement of the cam follower into linear movement of the drive member.

In an alternative configuration, the first converting means can include an eccentric member connected to the electric motor means for rotation therewith and having an external periphery. The drive member can include a connecting rod and slide block. The connecting rod has a complementary aperture formed therein for operably receiving the external periphery of the eccentric member. The connecting rod also includes a pivot pin for operably connecting to the slide block, such that the slide block is driven in reciprocal motion by the connecting rod in response to rotation of the eccentric member.

Another alternative embodiment can include the first converting means having a barrel cam connected to the electric motor means for rotation therewith. The barrel cam has a generally helical cam surface formed on an external periphery. The drive member has an aperture for receiving the barrel cam. A cam follower is supported by the drive member and is engageable with the cam surface for driving the drive member in linear motion in response to rotary motion of the barrel cam. Preferably, the generally helical cam surface is formed having reduced longitudinal spacing between turns adjacent one or both longitudinal ends to impart a harmonic motion to the clamp arm while approaching the respective end limit of movement corresponding to the clamped position and the released position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of an electric power operated clamp according to the present invention;

FIG. 4 is a simplified schematic view of an alternative embodiment of first converting means for converting the rotary motion driving force of the electric motor means into a linear reciprocal motion of a drive member according to the present invention; and FIG. 5 is a simplified schematic view of an alternative embodiment of the first converting means.

DESCRIPTION OF THE PREFERRED AND ALTERNATIVE EMBODIMENTS

Figure 3:
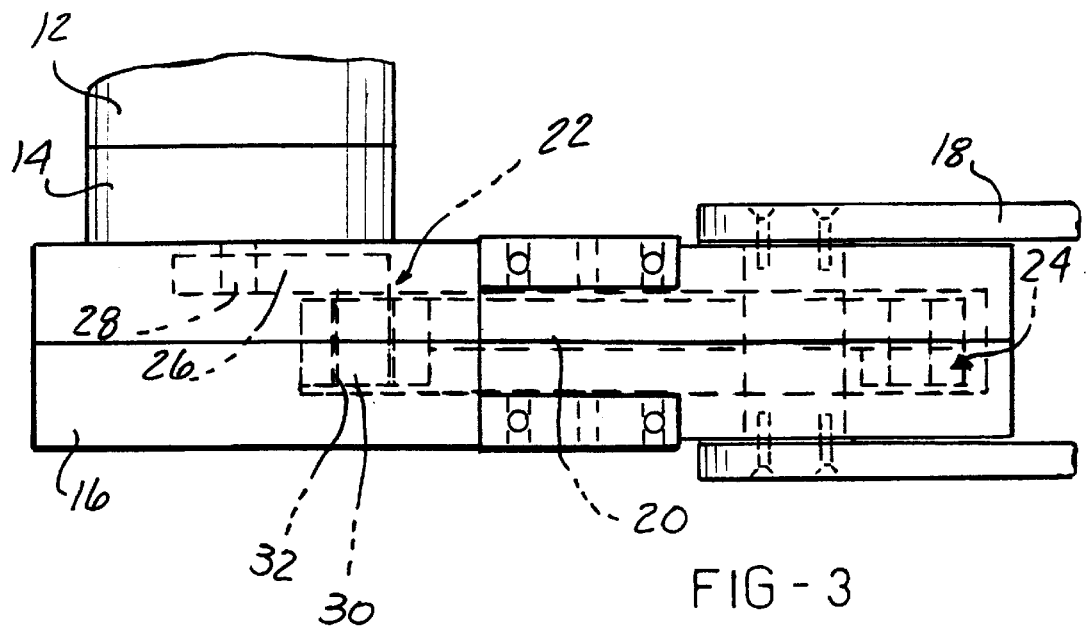
FIG. 3 is a top view of the electric power operated clamp illustrated in FIG. 2 with the housing in place enclosing the internal mechanism.

A power operated clamp 10 is illustrated in perspective view in FIG. 1. The power operated clamp 10 includes an electric motor means 12 for imparting a rotary motion driving force to the clamp assembly. A gear box 14 can be provided, if required between the electric motor means 12 and the clamp actuator housing 16. A clamp member 18 is operably associated with the housing 16 for movement between a clamped position and a released position.

Figure 2:
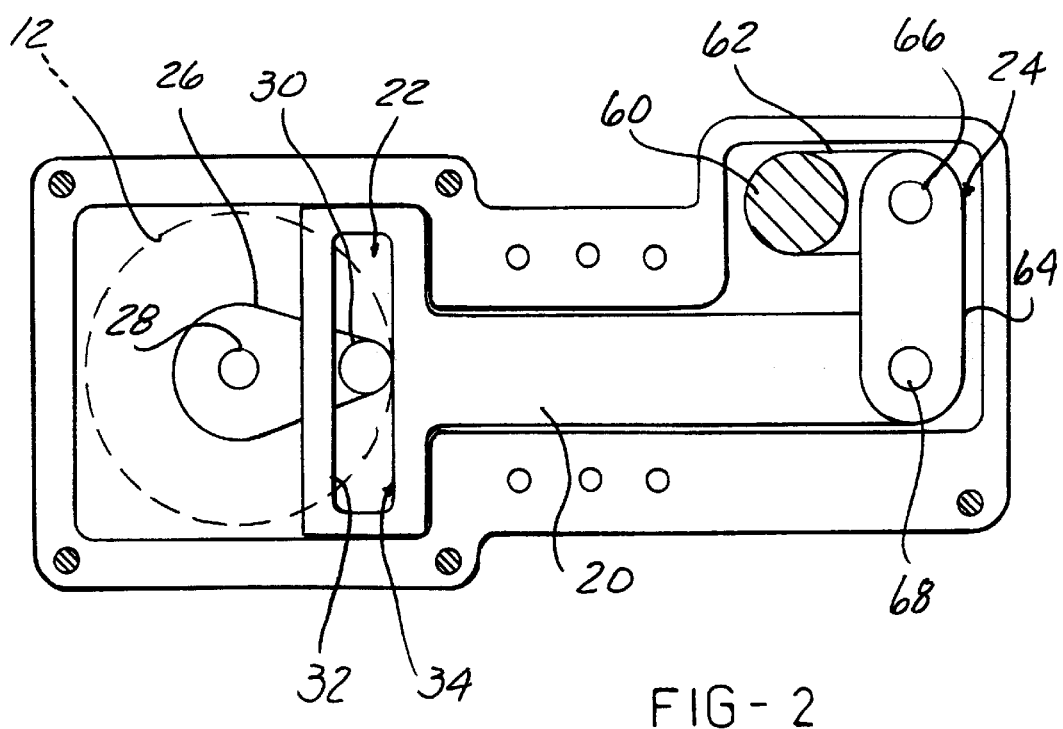
FIG. 2 is a simplified internal view of the clamp with one half of the housing removed in order to show the internal mechanism.

Referring now to FIGS. 2 and 3, a drive member 20 is operably associated with the electric motor means 12. First converting means 22 connects the drive member 20 to the electric motor means 12. The first converting means 22 is for converting the rotary motion driving force of the electric motor means 12 into a linear reciprocal motion of the drive member 20. Second converting means 24 connects the clamp member 18 to the drive member 20. The second converting means 24 is for converting the linear reciprocal motion of the drive member 20 into rotary motion of the clamp member 18 to move the clamp member 18 between a clamped position and a released position.

In the embodiment depicted in FIGS. 2 and 3, the first converting means 22 can include an elongate arm 26 connected to an output shaft 28 of the electric motor means 12. The elongate arm 26 extends radially outwardly for rotation with the shaft 28. A follower 30 is connected to the elongate arm 26 and is spaced radially from the longitudinal axis of the shaft 28. The drive member 20 is mounted for linear reciprocal movement along a fixed path, and has a cam surface 32 adjacent one longitudinal end of the elongate drive member 20. Preferably, the cam surface 32 finds a slot 34, and more preferably the slot 34 extends generally normal to the fixed path of travel for the drive member 20. The follower 30 operably engages within the slot 34 for converting the rotational movement of the follower 30 into linear movement of the drive member 20. In the preferred configuration illustrated in FIGS. 2 and 3, the slot 34 is linear and generally perpendicular to the fixed path of the drive member 20. This configuration provides the desired harmonic motion clamp action.

An alternative configuration of the first converting means 22a is illustrated in FIG. 4. In this configuration, an eccentric member 36 is connected to the shaft 28a of the electric motor means for rotation therewith. The eccentric member 36 has an external periphery 38. In this embodiment, the drive member 20a includes a connecting rod 40 and a slide block 42. The connecting rod 40 has a complementary aperture 44 formed therein for operably receiving the external periphery 38 of the eccentric member 36. The connecting rod 40 also includes a pivot point or pin 46 for operably connecting the connecting rod 40 to the slide block 42. The slide block 42 is driven in reciprocal motion by the connecting rod 40 in response to rotation of the eccentric member 36. This configuration for the first converting means 22a also provides the desirable harmonic motion clamp action, sometimes referred to as a "soft-touch" clamp. In this respect, both the embodiment depicted in FIGS. 2 and 3, and the alternative configuration of the first converting means 22a of FIG. 4 provide a clamp that decelerates adjacent the clamped position and the released position, while achieving maximum acceleration generally midway between the clamped position and released position. This configuration eliminates the need for "bumpers" or other shock absorbing elements at the end limit of movement of the clamp.

Another alternative configuration for the first converting means 22b is illustrated in FIG. 5. In this embodiment, the first converting means 22b includes a barrel cam 48. The barrel cam 48 includes an aperture 50 for receiving an output shaft of the electric motor means, so that the barrel cam 48 is driven in rotation in response to rotation of the shaft of the electric motor means. The barrel cam 48 includes a generally helical cam surface 52 formed on an external periphery 54. The drive member 20b includes an aperture 56 for receiving the barrel cam 48. A cam follower 58 is supported by the drive member 20b and is engagable with the cam surface 52 for driving the drive member 20b in linear motion in response to rotary motion of the barrel cam 48. Preferably, the generally helical cam surface 52 is formed having reduced longitudinal spacing between turns adjacent one or both longitudinal ends of the barrel cam 48 to impart a harmonic motion to the clamp member 18 while approaching one or both end limits of movement corresponding to either or both of the clamped position and the released position. This embodiment also provides the first converting means 22 with the desirable harmonic motion driving force provided in the previously described embodiments.

Referring now to FIG. 2, the second converting means 24 can include a pivot pin 60 operably connected to the clamp member 18 for moving the clamp member 18 between a released position and a clamped position about a rotational axis. The pivot pin 60 has a radially extending arm 62. An elongate link 64 has a first pivot connection 66 to the radially extending arm 62 of the pivot pin 60 and a second pivot connection 68 to the drive member 20, 20a, or 20b opposite from the first converting means 22, 22a, or 22b. For purposes of illustration and not limitation, the second converting means 24 can be similar in construction for each of the alternative embodiments discussed in detail above. Preferably, the second converting means 24 converts the harmonic linear reciprocal motion of the drive member 20, 20a, or 20b into rotational harmonic motion, or "soft-touch" motion of the clamp member 18 as it approaches one or both end limits of travel.

In the preferred configuration illustrated in FIGS. 1–3, the power operated clamp 10 includes an electric motor connected to an output shaft with a longitudinal axis. The shaft can be connected to the first converting means 22, 22a, or 22b, directly or through a gear box 14 as appropriate for the particular power operated clamp. An elongate arm 26 is connected to the shaft 28 and extends radially outwardly from the longitudinal axis for rotation with the shaft 28. A follower 30 is connected to the elongate arm 26 and is spaced radially from the longitudinal axis of the shaft. A housing 16 at least partially encloses the elongate arm 26 and follower 30. An elongate drive member 20 is mounted for linear reciprocal movement along a fixed path with respect to the housing 16. The drive member 20 has a cam surface 32 defining a linear slot 34 adjacent one longitudinal end of the elongate drive member 20. The slot 34 preferably extends normal to the fixed path of reciprocal movement for the drive member 20. The follower 30 operably engages within the slot 34 for converting the rotational movement of the follower 30 into linear movement of the drive member 20. At least one elongate link member 64 is pivotally connected to a longitudinal end of the drive member 20 opposite from the slot 34. A pivot pin 60 includes an arm 62 connected thereto for rotational movement therewith. The pin 60 is supported in the housing 16 for rotation with respect to the housing 16. The arm 62 is pivotally connected to the link member 64 for converting linear movement of the elongate drive member 20 into rotational movement of the pivot pin 60 through the link member 64. A clamp member 18 is connected to the pivot pin 60 for movement between a clamped position and a released position in response to movement of the drive member 20 operably engaging the follower 30 driven by the electric motor 12.

In one embodiment, the first converting mechanism includes a elongate arm driven by the rotatable shaft of the electric motor and extending radially outwardly with a follower connected to the elongate arm spaced from the axis of rotation. A cam surface is formed on the drive member and is engaged by the follower for driving the drive member in reciprocal linear harmonic motion in response to rotation of the shaft. In a second embodiment, the first converting mechanism includes an eccentric member connected to the shaft driven by the electric motor and the drive member including a connecting rod and slide block, where the connecting rod has a complementary aperture for operably receiving the internal periphery of the eccentric member and a pivot point for operably connecting to the slide block, so that the slide block is driven in reciprocal linear harmonic motion by the connecting rod in response to rotation of the eccentric member. In a third embodiment, the first converting mechanism includes a barrel cam connected to the shaft driven by the electric motor for rotation. The barrel cam has a generally helical cam surface formed on an external periphery, and the drive member has an aperture for receiving the barrel cam. The cam follower is supported by the drive member and is engageable with the cam surface for driving the drive member in reciprocal linear harmonic motion in response to rotary motion of the barrel cam.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A power operated clamp comprising:
   electric motor means for imparting a rotary motion driving force;
   a drive member operably associated with the electric motor means;
   first converting means, connecting the drive member to the electric motor means, for converting the rotary motion driving force into a linear reciprocal harmonic motion of the drive member;
   a clamp member operably associated with the drive member; and
   second converting means, connecting the clamp member to the drive member, for converting the linear reciprocal harmonic motion of the drive member into rotary harmonic motion of the clamp member to move the clamp member between a clamped position and a released position.

2. The clamp of claim 1 wherein the first converting means further comprises:
   an elongate arm connected to the electric motor means and extending radially outwardly for rotation about an axis of rotation;
   a substantially circular follower connected to the elongate arm spaced radially from the axis; and
   the drive member mounted for linear reciprocal movement along a fixed path, the drive member having a cam surface defining a slot adjacent one longitudinal end of the elongate drive member, the follower operably engageable within the slot for converting the rotational movement of the follower into linear movement of the drive member.

3. The clamp of claim 2 wherein the drive member slot extends normal to the fixed path.

4. The clamp of claim 2 wherein the drive member slot is linear.

5. The clamp of claim 1 wherein the first converting means further comprises:

an eccentric member connected to the electric motor means for rotation therewith and having an external periphery; and
the drive member including a connecting rod and a slide block, the connecting rod having a complementary aperture formed therein for operably receiving the external periphery of the eccentric member and a pivot point for operably connecting to the slide block, such that the slide block is driven in reciprocal motion by the connecting rod in response to rotation of the eccentric member.

6. The clamp of claim 1 wherein the first converting means further comprises:
   an elongate barrel cam connected to the electric motor means for rotation about an axis of rotation and having a generally helical cam surface formed on an external periphery;
   the drive member having an aperture for receiving the barrel cam; and
   a cam follower supported by the drive member and engageable with the cam surface for driving the drive member in linear motion in response to rotary motion of the barrel cam.

7. The clamp of claim 6 wherein the generally helical cam surface is formed having reduced longitudinal spacing between turns adjacent each end to impart a harmonic motion to the clamp member, such that said clamp member decelerates while approaching an end limit of movement corresponding to the clamped position and the released position.

8. The clamp of claim 1 wherein the second converting means further comprises:
   a pivot pin operably connected to the clamp member for moving the clamp member between a released position and a clamped position about a rotational axis, and the pivot pin having a radially extending arm; and
   an elongated link having a first pivot connection to the radially extending arm of the pivot pin and a second pivot connection to the drive member opposite from the first converting means.

9. A power operated clamp comprising:
   an electric motor connected to drive an output shaft in rotation with respect to a longitudinal axis;
   an elongate arm connected to the output shaft and extending radially outward for rotation about the axis of rotation;
   a substantially circular follower connected to the elongate arm spaced radially from the axis;
   a drive member mounted for linear reciprocal harmonic movement along a fixed path, the drive member having a cam surface defining a slot adjacent one longitudinal end of the elongate drive member, the follower operably engageable within the slot for converting the rotational movement of the follower into linear reciprocal harmonic movement of the drive member;
   at least one link member pivotally connected to a longitudinal end of the drive member;
   a pivot pin having an arm connected thereto, the pin supported in the housing for rotation, the arm pivotally connected to the link member for converting linear movement of the elongate drive member into rotational movement of the pivot pin through the link member; and
   a clamp member connected to the pivot pin for movement between a clamped position and a released position in response to movement of the drive member.

10. The clamp of claim 9 wherein the drive member slot extends normal to the fixed path.

11. The clamp of claim 9 wherein the drive member slot is linear.

12. The clamp of claim 9 wherein the first converting means further comprises:

an eccentric member connected to the shaft for rotation therewith and having an external periphery; and the drive member including a connecting rod and a slide block, the connecting rod having a complementary aperture formed therein for operably receiving the external periphery of the eccentric member and a pivot point for operably connecting to the slide block, such that the slide block is driven in reciprocal motion by the connecting rod in response to rotation of the eccentric member.

13. The clamp of claim 9 wherein the first converting means further comprises:

an elongate barrel cam connected to the shaft for rotation about an axis of rotation and having a generally helical cam surface formed on an external periphery;

the drive member having an aperture for receiving the barrel cam; and a cam follower supported by the drive member and engageable with the cam surface for driving the drive member in linear motion in response to rotary motion of the barrel cam.

14. The clamp of claim 13 wherein the generally helical cam surface is formed having reduced longitudinal spacing between turns adjacent each end to impart a harmonic motion to the clamp member, such that said clamp member decelerates while approaching an end limit of movement corresponding to the clamped position and the released position.

15. In a clamping apparatus having a housing, a pivot pin mounted for pivoting movement about an axis of rotation with respect to the housing, and a clamp member connected to the pivot pin, the clamp member moveable between a clamped position and a released position in response to rotation of the pivot pin, the pivot pin having an arm extending radially outwardly from the axis of rotation, a drive member mounted for linear reciprocal movement along a fixed path with respect to the housing, and a linkage connecting the drive member to the arm of the pivot pin for converting reciprocal movement of the drive member into pivoting movement of the pivot pin, in combination the improvement comprising:

an electric motor operably connected to a shaft for driving the shaft in rotation about an axis of rotation; and first converting means for converting rotary motion of the shaft into reciprocal linear harmonic motion of the drive member.

16. The improvement of claim 15 wherein the first converting means further comprises:

an elongate arm connected to the shaft and extending radially outwardly from the axis of rotation of the shaft;

a substantially circular follower connected to the elongate arm spaced radially from the axis of rotation of the shaft; and a cam surface formed on the drive member and engaged by the follower for driving the drive member in reciprocal linear movement in response to rotation of the shaft.

17. The clamp of claim 15 wherein the first converting means further comprises:

an eccentric member connected to the shaft for rotation therewith and having an external periphery; and the drive member including a connecting rod and a slide block, the connecting rod having a complementary aperture formed therein for operably receiving the external periphery of the eccentric member and a pivot point for operably connecting to the slide block, such that the slide block is driven in reciprocal motion by the connecting rod in response to rotation of the eccentric member.

18. The clamp of claim 15 wherein the first converting means further comprises:

an elongate barrel cam connected to the shaft for rotation about an axis of rotation and having a generally helical cam surface formed on an external periphery;

the drive member having an aperture for receiving the barrel cam; and a cam follower supported by the drive member and engageable with the cam surface for driving the drive member in linear motion in response to rotary motion of the barrel cam.

19. The clamp of claim 18 wherein the generally helical cam surface is formed having reduced longitudinal spacing between turns adjacent each end to impart a harmonic motion to the clamp member, such that said clamp member decelerates while approaching at least one end limit of movement corresponding to at least one of the clamped position and the released position.

* * * * *